United States Patent
Lykke

[11] Patent Number: 6,165,571
[45] Date of Patent: Dec. 26, 2000

[54] MULTILAYERED PACKAGING MATERIAL, IN PARTICULAR FOR FLEXIBLE PACKAGINGS

[75] Inventor: Kirsten Lykke, Silkeborg, Denmark

[73] Assignee: Danisco A/S, Copenhagen, Denmark

[21] Appl. No.: 09/155,893

[22] PCT Filed: Apr. 8, 1997

[86] PCT No.: PCT/DK97/00149

§ 371 Date: Oct. 8, 1998

§ 102(e) Date: Oct. 8, 1998

[87] PCT Pub. No.: WO97/38853

PCT Pub. Date: Oct. 23, 1997

[30] Foreign Application Priority Data

Apr. 12, 1996 [DK] Denmark ............................. 0419/96
Sep. 4, 1996 [DK] Denmark ............................. 0948/96

[51] Int. Cl.[7] .................................................. B29D 22/00
[52] U.S. Cl. ..................... 428/35.8; 428/36.6; 428/36.7; 428/412; 428/458; 428/461; 428/476.3; 428/483; 428/516
[58] Field of Search ................... 428/36.6, 36.7, 428/35.8, 412, 458, 461, 476.3, 483, 516

[56] References Cited

U.S. PATENT DOCUMENTS

| | | | |
|---|---|---|---|
| 3,949,114 | 4/1976 | Viola et al. | 428/337 |
| 4,457,977 | 7/1984 | Walles | 428/463 |
| 5,153,074 | 10/1992 | Migliorini | 428/463 |

FOREIGN PATENT DOCUMENTS

| | | |
|---|---|---|
| 0 096 581 | 12/1983 | European Pat. Off. . |
| 0 281 893 | 9/1988 | European Pat. Off. . |
| 0 340 910 | 8/1989 | European Pat. Off. . |
| WO/92/01558 | 2/1992 | WIPO . |
| WO 94/23941 | 10/1994 | WIPO . |
| WO 95/34424 | 12/1995 | WIPO . |

*Primary Examiner*—Leszek Kiliman
*Attorney, Agent, or Firm*—Sterne, Kessler, Goldstein & Fox

[57] ABSTRACT

A multilayered packaging material, in particular for flexible packagings, comprising when seen from the outer face to the inner face an outer, substantially transparent film (1) having a reverse print (2) on its inwardly facing surface; an intermediate layer (3, 4) connected to the printed surface of the outer film (1) and applied in fluid form to the inner, printed surface of the outer film (1); a metallization layer (5) connected to the inner face of the gas barrier layer (3) and an inner sealing medium layer (7), preferably in form of a polyolefine.

18 Claims, 1 Drawing Sheet

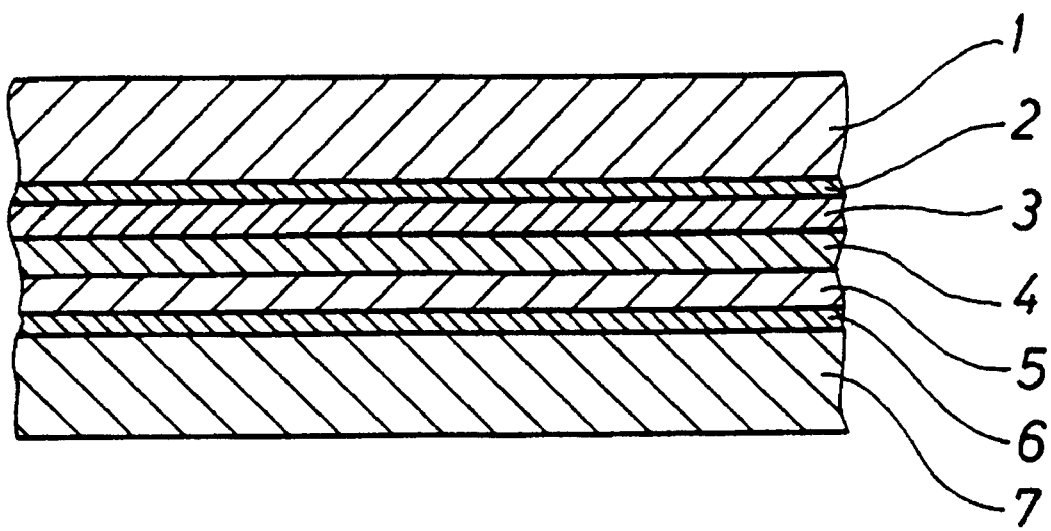

MULTILAYERED PACKAGING MATERIAL, IN PARTICULAR FOR FLEXIBLE PACKAGINGS

TECHNICAL FIELD

The invention relates to a multilayered packaging material, in particular for flexible packagings, and which when seen from the outer face to the inner face comprises:

- an outer, substantially transparent film having a reverse print on its inwardly facing surface;
- an intermediate layer connected to the printed surface of the outer film and applied in fluid form to the inner, printed surface of the outer film;
- a metallisation layer connected to the inner face of the intermediate layer and
- an inner sealing medium layer

BACKGROUND ART

In order to obtain good barrier properties against oxygen many packaging materials for foodstuffs whose quality deteriorates at oxidation such as coffee, dairy products etc comprise one or several barrier layers of an organic and/or inorganic nature. The organic barrier layer may be a film laminated to the other layers or applied to one of the other layers in the laminate in form of a dispersion or a solution or by extrusion coating. The inorganic barrier layer, which typically is a metal layer, may also be provided in form of a film or be applied to one of the other layers in the laminate by deposition, ie by metallisation. In order to minimize the costs of manufacture of the laminate it is preferable to prepare the organic layer from a dispersion or a solution or by extrusion coating and to form an inorganic layer by deposition.

In packagings with printed information or illustrations the printing is often made on the inner face of a transparent outer film to protect the print against damage and to obtain a visually more appealing print. If the inorganic barrier layer in form of a metallisation is applied directly to the printed surface, it will discolour the print. It is known to apply a protecting lacquer such as a polyurethane lacquer to the printed surface before the metallisation to prevent discoloration. As a result, a discoloration of the print is avoided in small metallising thicknesses, but in large metallising thicknesses an unwanted discoloration of the print still occur. The discoloration typically occurs in metallising thicknesses in excess of about 2 Ohm/square (about 200 Angstrom) corresponding to oxygen barrier properties of about 3 $cm^3/m^2/$24 hours. When a higher oxygen barrier is desired without the print being discoloured, a separate film is metallised and subsequently laminated to the printed transparent film, thus increasing the costs of manufacture of the packaging material.

EP-A-0 096 581, U.S. Pat. No. 3,949,114, WO92/01558, WO94/23941 and EP-B1-0 281 893 all disclose laminates comprising an organic barrier layer (typically in form of an EVOH film) as well as an inorganic barrier layer (typically in form of a metallisation) so as to improve the oxygen barrier properties.

Further it is known from U.S. Pat. No. 5,153,074 that improved $O_2$ barrier properties are obtained by coating a polymer film with EVOH for instance by extrusion coating and subsequently metallise the EVOH coating.

Finally U.S. Pat. No. 4,457,977 and EP-A2-0,340,910 both disclose that an improved $O_2$ barrier is obtained by coating a polymer film with an organic polymer in form of a dispersion or a solution and subsequently metallise said coating.

BRIEF DESCRIPTION OF THE INVENTION

The object of the invention is to provide a multilayered packaging material of the above type providing improved gas barrier properties without discoloration of the print.

The packaging material according to the invention is characterised in that the intermediary layer comprises an organically based gas barrier layer. Surprisingly, it is been found that in addition to improving the barrier properties of the packaging material an organically based gas barrier layer is also able to prevent the metallisation layer from discolouring the print. In practice, excellent barrier properties, eg an $O_2$ permeability of $\leq 0.1$ $cm^3/m^2/$24 hours, have been obtained in comparatively small metallising thicknesses of about 3 Ohm/square (about 100 Angstrom) without discoloration of the print. Further, surprisingly it has been found that good $O_2$ barrier properties are also obtained after flexure (Gelbo flexures) when the inorganic barrier layer is applied directly onto the organic barrier layer.

According to the invention the intermediary layer may comprise a primer layer between the printed surface of the outer film and the gas barrier layer in order to increase the adhesion of the gas barrier layer to the printed surface of the outer film.

Moreover according to the invention the organic coating per se may have an $O_2$ permeability of less than 10 $cm^3/m^2/$24 hours, preferably of less than 5 $cm^3/m^2/$24 hours.

Furthermore according to the invention the organically based barrier layer may comprise a dispersion or a solution comprising at least one of the materials: ethylene vinyl alcohol (EVOH), polyvinyl alcohol (PVOH) and polyvinylidene chloride (PVDC), preferably EVOH, and preferably in a thickness of between 0.5 and 3 $\mu$m, most preferably of between 0.7 and 1.8 $\mu$m. In terms of the barrier properties it is preferred that the organically based barrier layer per se has an $O_2$ permeability of less than about 10 $cm^3/m^2/$24 hours, most preferably of less than 5 $cm^3/m^2/$24 hours. The barrier layer can be applied by means of any known coating process such as roller coating, eg smooth roller coating and gravure roller coating, spray coating and dip coating. In practice excellent results have been obtained by smooth roller coating.

Moreover according to the invention the organically based barrier layer may comprise at least one of the materials: EVOH, PVDC, preferably EVOH, applied by extrusion coating or co-extrusion coating and preferably in a thickness of between 2 and 10 $\mu$m, most preferably of between 3 and 5 $\mu$m.

Furthermore according to the invention the outer film may at least be oriented in the machine direction and preferably biaxially oriented.

Moreover according to the invention the outer film may comprise at least one material selected among polyolefines, polyamides, polyesters and polycarbonates.

Furthermore according to the invention the metallisation layer may be a deposited aluminum layer of a thickness of about 50 to 1000 Angstrom, preferably of 100 to 500 Angstrom. In practice, it has surprisingly been found that even comparatively small metallising thicknesses of about 100 Angstrom render an $O_2$ permeability of less than 0.1 $cm^3/m^2/$24 hours—both before and after flexure.

Finally according to the invention the sealing medium layer may comprise a polyolefine, preferably a polyethylene or a polypropylene or copolymers thereof.

BRIEF DESCRIPTION OF THE DRAWING

The invention is explained in detail below with reference to the drawing whose only illustration is a sectional view through an embodiment of the packaging material according to the invention.

BEST MODE FOR CARRYING OUT THE INVENTION

When seen from the outer face towards the inner face of a package the shown packaging material comprises an outer, substantially transparent film 1, which may be a single layered film or a laminate formed of several films, and preferably comprising a polyolefine, a polyamide or a polyester. The outer film 1 is reverse printed on its inwardly facing surface. A primer 3 is coated on the print 2 to provide good adhesion to an organically based gas barrier layer 4 applied to the primer either by extrusion coating or in form of a solution or dispersion, which is dried after application. The organically based barrier layer 4 comprises at least one of the barrier materials EVOH, PVOH and PVDC, preferably EVOH. A metallisation layer 5, preferably being a vacuum deposited aluminum layer, is vapour deposited on the gas barrier layer 4. An inner heat sealing layer 7 is adhered to the inorganic barrier layer 5 by means of an adhesive 6. The inner sealing medium layer 7 is typically a polyolefine, preferably a polyethylene or copolymers thereof.

The invention is further illustrated by means of the following examples:

EXAMPLE 1

A biaxially oriented polyester (PETP) film 1 having a thickness of 12 $\mu$m was printed on its inwardly facing side by means of nitrocellulose-based printing inks. The print 2 was coated with a polyurethane-based primer 3. By means of roller coating the primer 3 was coated with an EVOH coating in form of an alcohol/water solution of an EVOH granulate. An amount of about 1.2 g/m$^2$ (dry weight) was applied corresponding to a thickness of about 1 $\mu$m (dried). The EVOH coating per se had an O$_2$ permeability of about 3 cm$^3$/m$^2$/24 hours. The EVOH coating was dried in a drying tunnel at a temperature of between 100 and 130° C. The dried EVOH coating was metallised by vacuum deposition of aluminum. The metallising thickness was 3 Ohm/square (about 100 Angstrom). A PE film was laminated to the metallisation layer 5 by means of a two-component polyurethane adhesive 6.

The prepared laminate showed no signs of discoloration of the print.

The laminate had an O$_2$ permeability $\leq 0.1$ cm$^3$/m$^2$/24 hours.

A Gelbo flexure test showed that the O$_2$ barrier remained unchanged after twenty Gelbo flexures performed according to MIL-B-131G, FED-STD-101, method No 2017.

EXAMPLE 2

A laminate was prepared as in Example 1, the PETP film, however, being replaced by a co-extruded, oriented polypropylene film of a thickness of 30 $\mu$m and polyvinylbutyral (PVB) based printing inks being used.

No discoloration of the printed was found.

The laminate had an O$_2$ permeability of $\leq 0.1$ cm$^3$/m$^2$/24 hours. After twenty Gelbo flexures the laminate had an O$_2$ permeability of $>0.5$ cm$^3$/m$^2$/24 hours.

EXAMPLE 3

A laminate was prepared as in Example 1, the PETP film, however, being replaced by a 15 $\mu$m thick, oriented polyamide film and polyvinylbutyral (PVB) based printing inks being used.

No discoloration of the print was found.

The laminate had an O$_2$ permeability of $\leq 0.1$ cm$^3$/m$^2$/24 hours both before and after twenty Gelbo flexures.

Finally laminates were prepared corresponding to those in the above three Examples, however, having metallising thicknesses of 2 Ohm/square (about 200 Angstrom), 1.5 Ohm/square (about 275 Angstrom) and 1.2 Ohm/square (about 350 Angstrom) respectively. The laminates displayed O$_2$ barriers corresponding to the above mentioned.

Nor with the said increased metallising thicknesses any discoloration of the print was found.

EXAMPLE 4

A biaxially oriented polyester (PETP) film 1 having a thickness of 12 $\mu$m was printed on its inwardly facing side by means of nitrocellulose-based printing inks. The print 2 was coated with a polyurethane-based primer 3. The primer 3 was coated with a PVOH coating in form of an aqueous PVOH solution. An amount of about 1.4 g/m$^2$ (dry weight) was applied corresponding to a thickness of about 1.2 $\mu$m (dried). The PVOH coating was dried and the dried PVOH coating was metallised by vacuum deposition of aluminum. The metallising thickness was 3 Ohm/square (about 100 Angstrom). A PE film was laminated to the metallisation layer 5 by means of a two-component polyurethane adhesive 6.

The prepared laminate showed no signs of discoloration of the print.

The laminate had an O$_2$ permeability of $\leq 0.1$ cm$^3$/m$^2$/24 hours both before and after twenty Gelbo flexures.

A laminate corresponding to that described above, however, having a metallisation thickness of 1.5 Ohm/square (about 275 Angstrom) was produced, nor with this increased metallising thickness was discoloration of the print found.

The barrier properties were as stated above both before and after twenty Gelbo flexures.

What is claimed is:

1. A multilayered packaging material for flexible packagings and which—when seen from the outer face to the inner face of a packaging formed thereof—comprises:
    a substantially transparent outer film being a single or multilayered film and having a reverse print on its inwardly facing surface;
    an intermediate layer connected to the printed surface of said outer film and applied in fluid form to the inner, printed surface of said outer film;
    a metallisation layer connected to the inner face of said intermediate layer and;
    an inner sealing medium layer connected to the inner face of said metallisation layer;
    wherein said intermediate layer comprises a gas barrier layer based on organic polymer.

2. A packaging material according to claim 1, wherein said intermediate layer comprises a primer layer between the printed surface of said outer film and said gas barrier layer.

3. A packaging material according to claim 1, wherein said gas barrier layer based on organic polymer per se has an O$_2$ permeability of less than 10 cm$^3$/m$^2$/24 hours.

4. A packaging material according to claim 1, wherein said gas barrier layer based on organic polymer comprises a dispersion or a solution comprising at least one of the materials EVOH, PVOH and PVDC and of a thickness of 0.5 to 3 $\mu$m.

5. A packaging material according to claim 1, wherein said gas barrier layer based on organic polymer comprises at least one of the materials EVOH and PVDC, applied by extrusion coating or co-extrusion coating and of a thickness of between 2 to 10 μm.

6. A packaging material according to claim 1, wherein said outer film is oriented at least in the machine direction.

7. A packaging material according to claim 1, wherein said outer film comprises at least one material selected among polyolefines, polyamides, polyesters and polycarbonates.

8. A packaging material according to claim 1, wherein said metallisation layer is a deposited aluminum layer.

9. A packaging material according to claim 8, wherein said metallisation layer has a thickness of between 5 to 10 nm (50 to 1000 Angstrom).

10. A packaging material according to claim 1, wherein said inner sealing medium layer comprises a polyolefine.

11. A packaging material according to claim 1, wherein said gas barrier layer based on organic polymer per se has an $O_2$ permeability of less than 5 $cm^3/m^2/24$ hours.

12. A packaging material according to claim 1, wherein said gas barrier layer based on organic polymer comprises a dispersion or a solution comprising at least one of the materials EVOH, PVOH and PVDC and of a thickness of 0.7 to 1.8 μm.

13. A packaging material according to claim 1, wherein said gas barrier layer based on organic polymer comprises a dispersion or a solution comprising EVOH and of a thickness of 0.5 to 3 μm.

14. A packaging material according to claim 1, wherein said gas barrier layer based on organic polymer comprises a dispersion or a solution comprising EVOH and of a thickness of 0.7 to 1.8 μm.

15. A packaging material according to claim 1, wherein said gas barrier layer based on organic polymer comprises at least one of the materials EVOH and PVDC, applied by extrusion coating or co-extrusion coating and of a thickness of between 3 to 5 μm.

16. A packaging material according to claim 1, wherein said gas barrier layer based on organic polymer comprises EVOH, applied by extrusion coating or co-extrusion coating and of a thickness of between 2 to 10 μm.

17. A packaging material according to claim 1, wherein said gas barrier layer based on organic polymer comprises EVOH, applied by extrusion coating or co-extrusion coating and of a thickness of between 3 to 5 μm.

18. A packaging material according to claim 8, wherein said metallisation layer has a thickness of 10 to 50 nm (100 to 500 Angstrom).

* * * * *